US011401985B2

(12) United States Patent
Mantovan

(10) Patent No.: US 11,401,985 B2
(45) Date of Patent: Aug. 2, 2022

(54) EPICYCLIC GEAR SYSTEM AND GAS TURBINE ENGINE

(71) Applicant: Rolls-Royce Deutschland Ltd & Co KG, Blankenfelde-Mahlow (DE)

(72) Inventor: Luca Mantovan, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 347 days.

(21) Appl. No.: 16/547,819

(22) Filed: Aug. 22, 2019

(65) Prior Publication Data

US 2020/0096061 A1   Mar. 26, 2020

(30) Foreign Application Priority Data

Sep. 20, 2018   (DE) ..................... 10 2018 123 220.9

(51) Int. Cl.
  *F16D 41/06*   (2006.01)
  *F02C 7/36*   (2006.01)
  (Continued)

(52) U.S. Cl.
  CPC ................ *F16D 41/06* (2013.01); *F02C 7/36* (2013.01); *F16D 43/211* (2013.01);
  (Continued)

(58) Field of Classification Search
  CPC .. F16H 2057/085; F16H 1/2863; F16H 29/14; F16D 43/211; F16D 41/06;
  (Continued)

(56) References Cited

U.S. PATENT DOCUMENTS 5,234,089 A * 8/1993 Itomi ..................... F16D 45/00
  192/48.92
2003/0123767 A1   7/2003 Fite et al.
(Continued)

FOREIGN PATENT DOCUMENTS

CN    1182472 A    5/1998
DE    102007040029    8/2007
(Continued)

OTHER PUBLICATIONS

German Search Report dated Jul. 11, 2019 from Counterpart German App No. 10 2018 123 220.9.
(Continued)

*Primary Examiner* — David R Morris
*Assistant Examiner* — Lori Wu
(74) *Attorney, Agent, or Firm* — Shuttleworth & Ingersoll, PLC; Timothy J. Klima

(57) ABSTRACT

An epicyclic gear system for a gas turbine engine includes a planet carrier with at least one structural member, on which a planet gear is pivot-mounted by a bearing that is radially arranged between the planet gear and the structural member. Furthermore, a roller bearing device is arranged radially between the planet gear and the bearing. A relative movement between the planet gear and the bearing is prevented by the roller bearing device, if a friction torque in the region of the bearing is less than or equal to a threshold value.

15 Claims, 13 Drawing Sheets

(51) Int. Cl.
*F16D 43/21* (2006.01)
*F16H 1/28* (2006.01)
*F16H 29/14* (2006.01)
*F16H 57/08* (2006.01)

(52) U.S. Cl.
CPC ........... *F16H 1/2863* (2013.01); *F16H 29/14* (2013.01); *F16H 2057/085* (2013.01)

(58) Field of Classification Search
CPC .......... F16D 41/067; F02C 7/36; F16C 17/02; F16C 19/28
See application file for complete search history.

(56) References Cited

U.S. PATENT DOCUMENTS

| 2010/0331140 | A1 | | 12/2010 | McCune |
| 2013/0278100 | A1 | | 10/2013 | Fujiwara |
| 2013/0324343 | A1 | * | 12/2013 | Gallet ....................... F02K 3/06 475/159 |
| 2015/0204395 | A1 | * | 7/2015 | Mori ...................... F16D 41/067 192/45.008 |
| 2017/0089219 | A1 | | 3/2017 | Hasting et al. |
| 2018/0195601 | A1 | * | 7/2018 | Hallman ................ F16C 33/581 |
| 2020/0011411 | A1 | * | 1/2020 | Gilliland ................... F02K 3/06 475/159 |

FOREIGN PATENT DOCUMENTS

| DE | 102016218034 A1 | | 3/2018 |
| EP | 499309 A1 | * | 8/1992 |
| EP | 3199839 A1 | | 8/2017 |
| JP | 3713800 B2 | | 11/2005 |
| WO | 2017204183 A1 | | 11/2017 |

OTHER PUBLICATIONS

European Search Report dated Sep. 25, 2019 for counterpart European Patent Application No. 19189317.1.

* cited by examiner

EPICYCLIC GEAR SYSTEM AND GAS TURBINE ENGINE

This application claims priority to German Patent Application DE102018123220.9 filed Sep. 20, 2018, the entirety of which is incorporated by reference herein.

The present disclosure relates to an epicyclic gear system, and to a gas turbine engine.

A typical gas turbine engine includes a fan section, a compressor section, a combustor section, and a turbine section. The air entering the compressor section is compressed, and delivered into the combustion section where it is mixed with fuel, and ignited to generate a high-speed exhaust gas flow. The high-speed exhaust gas flow expands through the turbine section to drive the compressor, and the fan section. The compressor section typically includes low-pressure and high pressure compressors, and the turbine section includes low-pressure and high-pressure turbines.

Epicyclic gearboxes with planetary or star gear trains may be used in gas turbine engines for their compact designs, and efficient high gear reduction capabilities. Planetary and star gear trains generally include three gear train elements: a central sun gear, an outer ring gear with internal gear teeth, and a plurality of planet gears supported by a planet carrier between, and in meshed engagement with both the sun gear and the ring gear. The gear train elements share a common longitudinal central axis, about which at least two rotate. An advantage of epicyclic gear trains is that a rotary input can be connected to any one of the three elements. One of the other two elements is then held stationary with respect to the other two to permit the third to serve as an output. In gas turbine engine applications, where a speed reduction transmission is required, the central sun gear generally receives rotary input from the powerplant, the outer ring gear is generally held stationary, and the planet gear carrier rotates in the same direction as the sun gear to provide torque output at a reduced rotational speed. In star gear trains, the planet carrier is held stationary, and the output shaft is driven by the ring gear in a direction opposite that of the sun gear.

Existing gas turbine engines for aircrafts incorporate gearboxes to drive the fan section such that the fan section may rotate at a speed different than the turbine section so as to increase the overall propulsive efficiency of the engine.

In engine architectures incorporating a gearbox, a shaft driven by one of the turbine sections provides an input to the epicyclical gear assembly that drives the fan section at a reduced speed such that both the turbine section and the fan section can rotate closer to optimal speeds.

Such a gearbox incorporates roller or journal bearings to reduce friction losses at the interface between planet gears and carrier. Roller bearings have the disadvantage to be complex and sensible to the high centrifugal forces, while journal bearings are simpler and cope well with high centrifugal forces, but are less robust to noise factors, and have more serious effects on the entire system, in case of seizure.

It is the object of the present disclosure to provide a robust epicyclic gear system as well as a fail-safe gas turbine engine.

This object is achieved through an epicyclic gear system, and with a gas turbine engine with features as disclosed herein.

According to a first aspect there is provided an epicyclic gear system comprising a planet carrier with at least one structural member, on which a planet gear is pivot-mounted by a bearing. The bearing is arranged radially between the planet gear and the structural member. Furthermore, the epicyclic gear system is comprising a roller bearing device that is arranged radially between the planet gear and the bearing. A relative movement between the planet gear and the bearing is prevented by the roller bearing device if a friction torque in the region of the bearing is less than or equal to a threshold value.

The bearing of the epicyclic gear system in accordance with the present disclosure is relieved if the bearing friction increases inadmissibly. This avoids unacceptably high loads on the bearing. For this purpose, the bearing function of the rolling bearing unit is enabled if the friction torque of the bearing is greater than the threshold value.

The bearing may be designed as a journal bearing. Then, the epicyclic gear system is characterized by a simple construction, and copes well with high centrifugal forces.

Alternatively, the bearing may be designed as a roller bearing. This leads to an epicyclic gear system, which is in contrast to the last mentioned epicyclic gear system with a journal bearing more robust to noise factors, and causes less serious effects on the functionality of the entire system of a gas turbine engine in case of seizure. The splitting of the planetary gear ensures the function of the planetary gear in a structurally simple manner even if a failure of the bearing occurs.

The disclosed epicyclic gear system requires only little space if the roller bearing device comprises a radially inner ring which is part of the bearing, and comprises in the area of its radially outer surface several roller ramps, in which roller elements of the roller bearing device are arranged between the inner ring and an outer ring, which outer ring is part of the planet gear.

According to a further aspect, the roller ramps are designed to release a relative movement between the inner ring and the outer ring if a friction torque in the region of the bearing is greater than a threshold value. Then, the epicyclic gear system is operable with low control and loop control effort.

According to a further aspect of the present disclosure, the roller bearing device comprises further roller elements which are arranged radially between the inner ring and the outer ring. By means of these further roller elements the load which is effective during a relative movement between the inner ring and the outer ring, is transmittable between the outer ring and the inner ring if the friction torque in the region of the bearing is greater than the threshold value.

Each roller element of the roller bearing device may be forced by a spring force of at least one spring in a direction of an area of the respective roller ramp, in which the roller elements are locking the relative movement between the inner ring and the outer ring. Then, the epicyclic gear system is also operable with low control and loop control effort.

The threshold value of an epicyclic gear system claimed herein is adaptable by modifying the spring force of the spring.

Furthermore, the threshold of an epicyclic gear system claimed herein is adaptable by modifying the value of the tangent of a clamping angle of the roller ramp.

In a further embodiment of the epicyclic gear device according to the present disclosure the roller bearing device comprises a plurality of roller ramp units. The roller ramp units may be arranged over the circumference of the inner ring and each roller ramp unit having two at least approximately mirror image-like arranged roller ramps and a plateau area arranged there between. The plateau areas each are extending radially further than the associated two roller ramps.

Moreover, in a further embodiment of the epicyclic gear system according to the present disclosure each roller ramp unit is cooperating with at least one roller element. The at least one roller element maybe arranged between two springs. The springs are arranging the roller element in the plateau area of the roller ramp unit, if the friction moment is smaller than or equal to the threshold value.

The epicyclic gear system allows a cost-effective manufacture, and can be operated with low control and low loop control effort if the roller bearing device comprises a freewheel.

The epicyclic gear system can be operated even in the case of seizure of the bearing with high efficiency, if the freewheel is designed as a roller freewheel.

The disclosed epicyclic gear system requires only little space, if the freewheel comprises a radially inner ring, which is part of the bearing, and comprises in the area of its radially outer surface several roller ramps, in which roller elements of the freewheel are arranged between the inner ring and an outer ring, which outer ring is part of the planet gear.

According to a further aspect, the roller ramps are designed to release a relative movement between the inner ring and the outer ring if a friction torque in the region of the bearing is greater than a threshold value. Then, the epicyclic gear system is operable with low control and loop control effort.

Each roller element of the freewheel may be forced by a spring force of a spring in a direction of a first area of the respective roller ramp, in which the roller elements are locking the relative movement between the inner ring and the outer ring. Then, the epicyclic gear system is also operable with low control and loop control effort.

Depending on the respective application, it is possible to design the roller elements as balls, cylinders, barrels or the like.

As noted elsewhere herein, the present disclosure relates to a gas turbine engine. Such a gas turbine engine may include an engine core comprising a turbine, a combustor, a compressor, and a core shaft connecting the turbine to the compressor. Such a gas turbine engine may comprise a fan (having fan blades) located upstream of the engine core.

The gas turbine engine as described and claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The unit may be designed as a gearbox, especially as a before mentioned epicyclic gear system that receives an input from the shaft and outputs drive to the fan so as to drive the fan at a lower rotational speed than the shaft. The input to the gearbox may be directly from the core shaft, or indirectly from the core shaft, for example via a spur shaft and/or gear or from a separate turbine. The core shaft may rigidly connect the turbine and the compressor, such that the turbine and compressor rotate at the same speed (with the fan rotating at a lower speed).

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (or ADP) may correspond to the conditions (comprising, for example, one or more of the Mach Number, environmental conditions and thrust requirement) for which the fan is designed to operate. This may mean, for example, the conditions at which the fan (or gas turbine engine) is designed to have optimum efficiency.

In use, a gas turbine engine described and claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
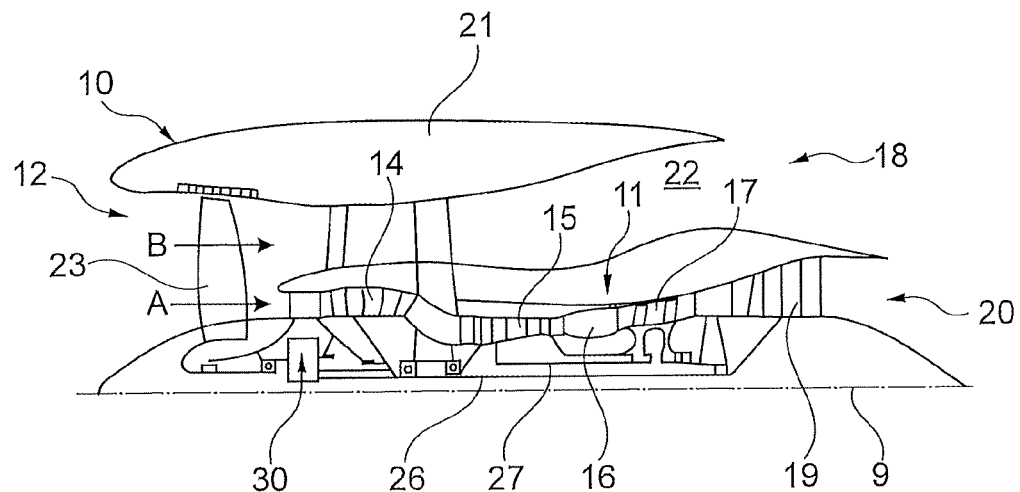
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10, and defines a bypass duct 22 and a bypass exhaust nozzle 18. The bypass airflow B flows through the bypass duct 22. The fan 23 is attached to and driven by the low pressure turbine 19 via a shaft 26 and an epicyclic gear system 30 which is an planetary gearbox.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted.

The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
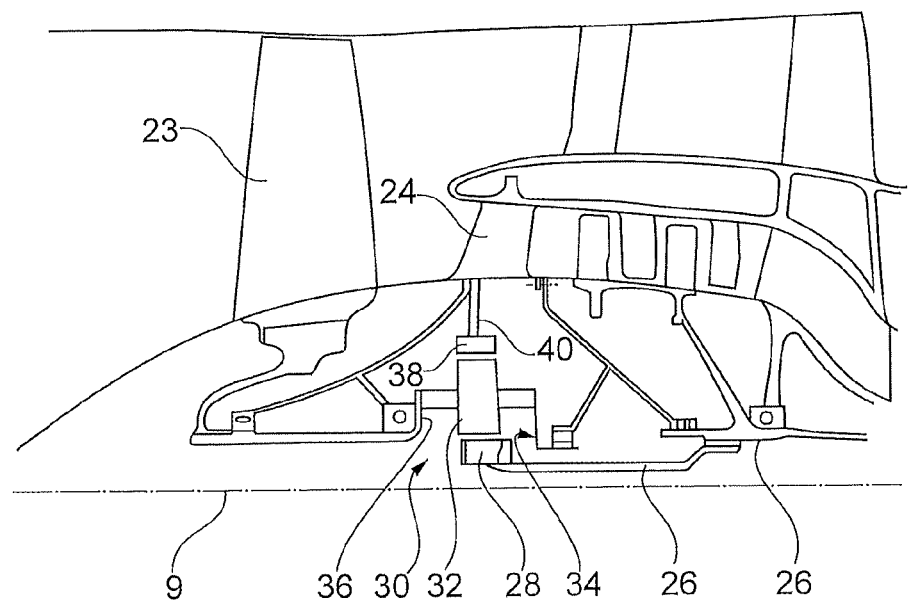
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
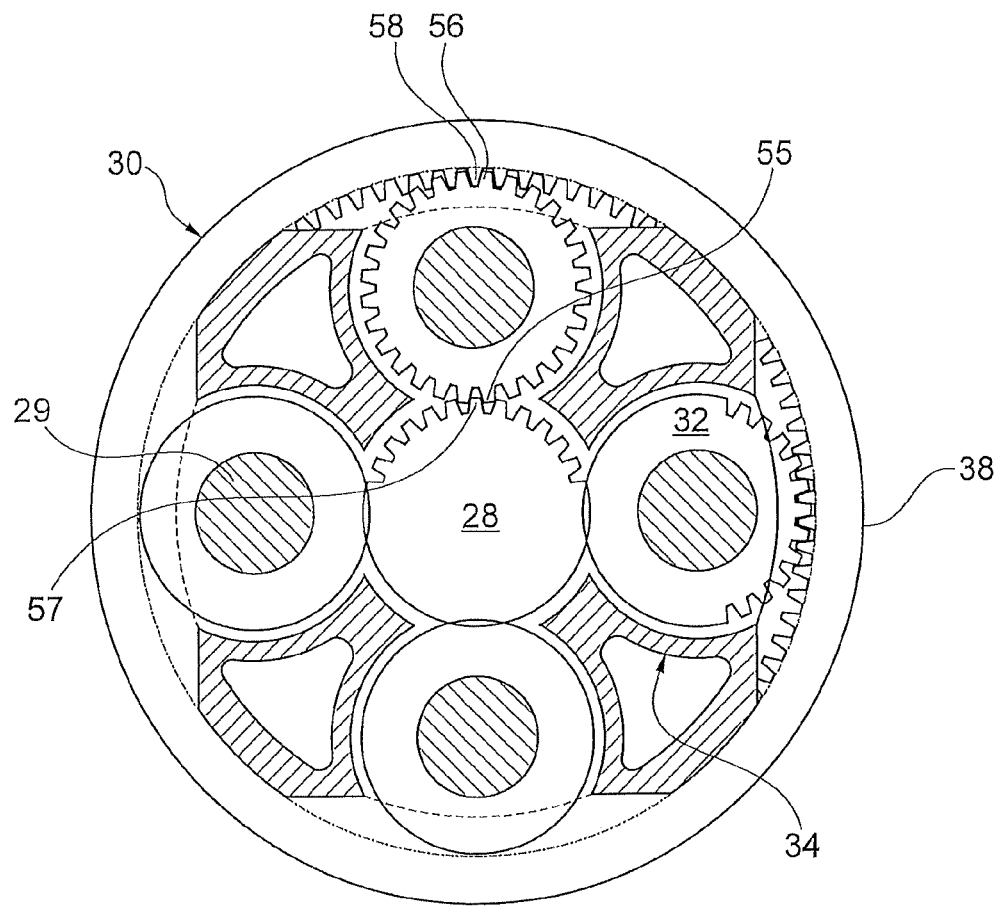
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of an epicyclic gearbox 30 generally comprise at least three planet gears 32.

The epicyclic gearbox 30 illustrated by way of example in FIG. 2 and FIG. 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
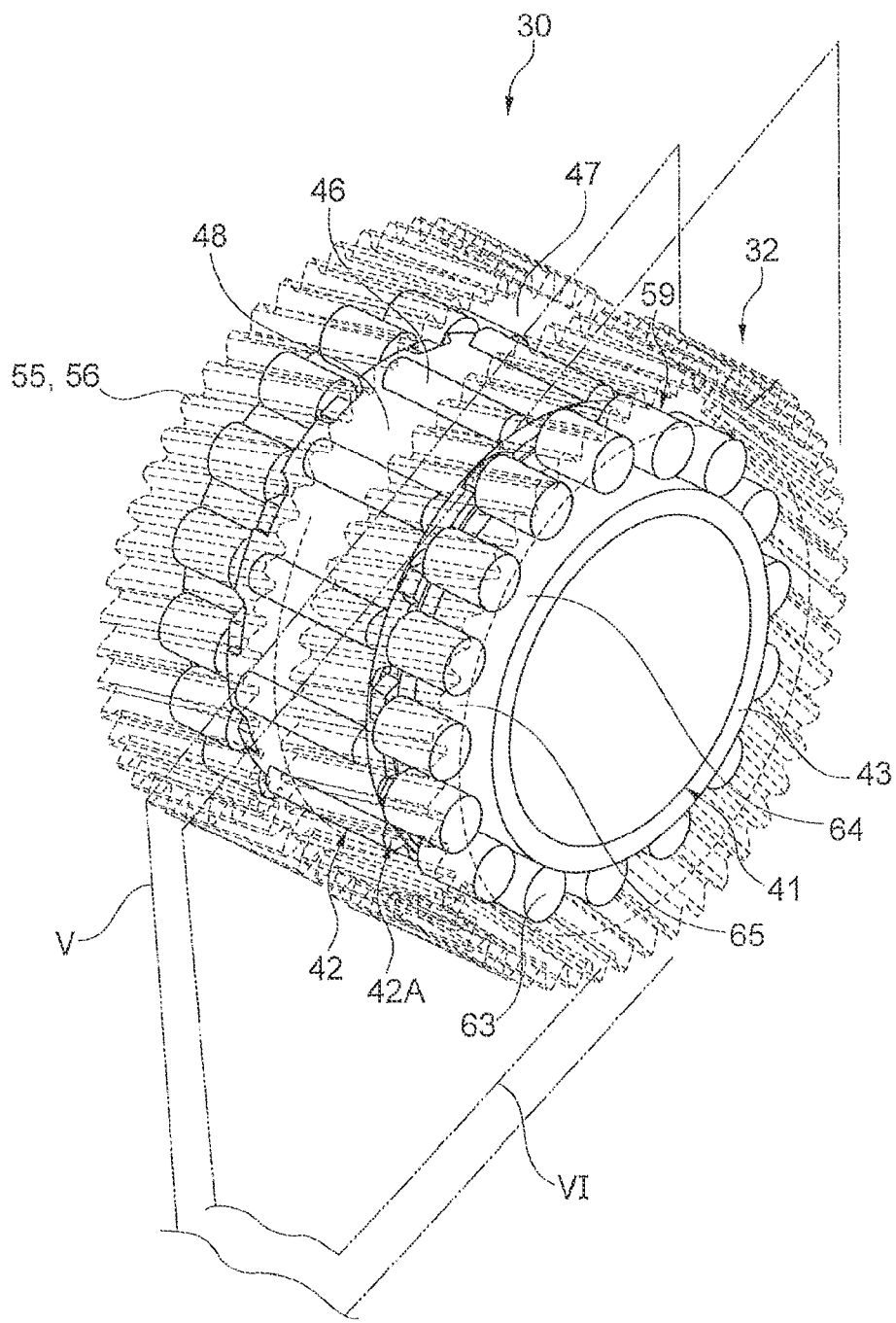
FIG. 4 is a three-dimensional view of a planet gear of the gear box according to FIG. 3.

FIG. 4 shows a three-dimensional view of one of the planet gears 32 and a part of the planet carrier 34 of the epicyclic gear system 30 according to FIG. 3. The planet carrier 34 has structural members 29, which are shown schematically in FIG. 3 and on which the planet gears 32 are pivot-mounted by bearings 41. The bearings 41 are arranged radially between the planet gears 32 and the structural members 29, which are designed as planet carrier pins. Furthermore, the bearings 41 are designed as journal bearings. Furthermore, roller bearing devices 42 are arranged radially between the planet gears 32 and the bearings 41. In the present embodiment each roller bearing device 42 comprises a freewheel 42A. The freewheels 42A are designed as roller freewheels. The planet gears 32 have only a low friction torque due to the viscous friction of the medium of the journal bearings 41.

This friction torque is balanced by a different distribution of forces between teeth 55, 56 of the planet gears 32, which are in contact with teeth 57 of the sun gear 28 and with teeth 58 of the ring gear 38. Under normal conditions, with the torque coming from the sun gear 28 and exiting through the planet carrier 34, the overloaded tooth 55 is the one toward the sun gear 28. Under windmilling conditions, it is the tooth 56 towards the ring gear 38 which carries more load.

Figure 5:
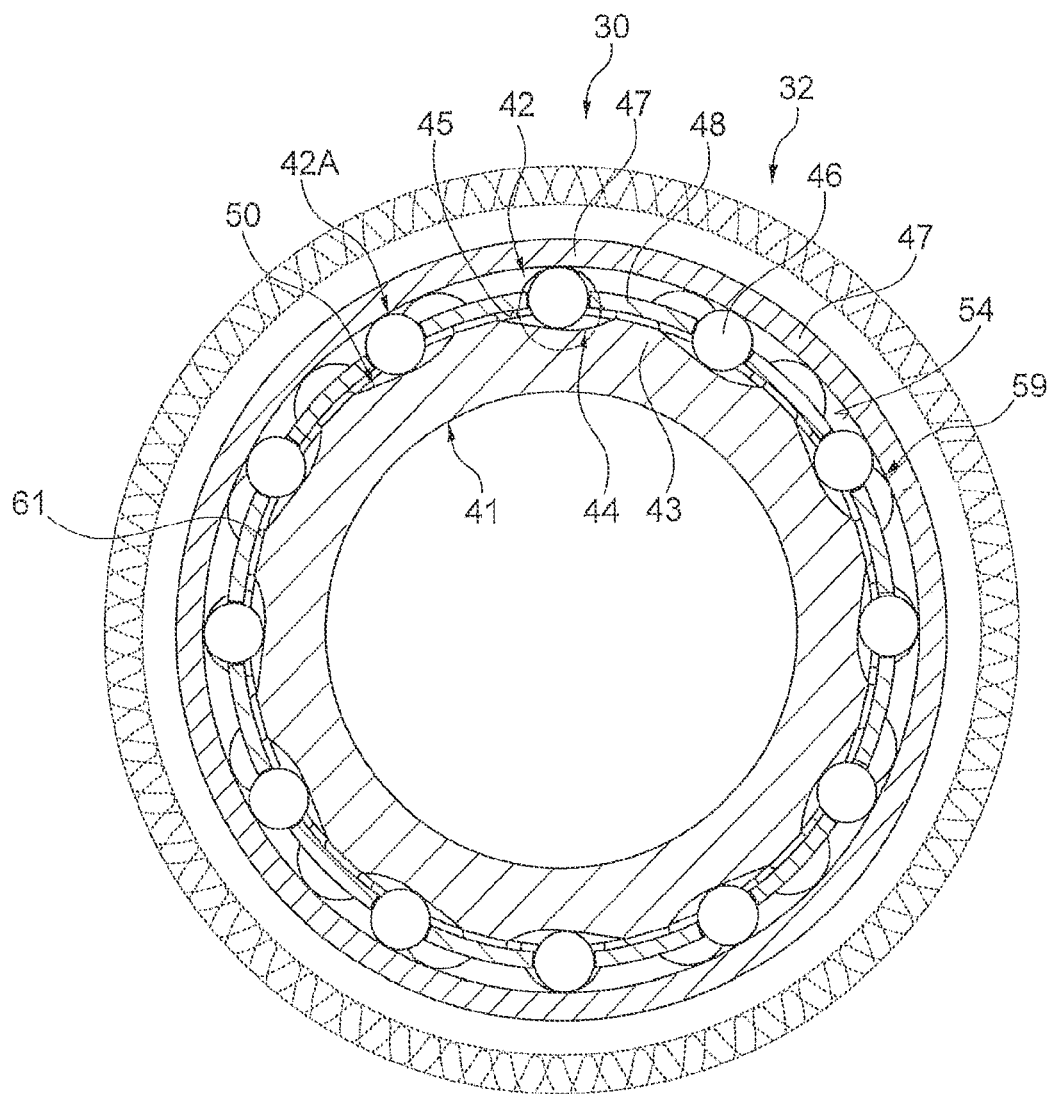
FIG. 5 is a cross-sectional view of the planet gear along a sectional plane V shown in FIG. 4.

As shown in FIG. 5 every roller bearing device 42 comprises a radially inner ring 43, which is part of the bearing 41. Each of the radial inner rings 43 of the roller bearing devices 42 comprises several roller ramps 44 in the area of its radially outer surface 45, in which roller elements 46 of the freewheels 42A are rotatable arranged between the inner rings 43 and outer rings 47, which are part of the planet gears 32. The roller ramps 44 are designed to unblock a relative movement between the inner ring 43 and the outer ring 47 when a friction torque in the region of the bearing 41 is greater than a threshold value.

In case of degraded functionality, failure or seizure of the journal bearing 41 the first effect is an increase of the friction torque and a subsequent increase of unbalanced distribution of forces between the teeth 55, 56, 57, 58. This could lead to different kinds of major failures of the entire system. To avoid that and to limit the increase of the friction it is proposed to back-up the main function of the journal bearings 41 and to pass it to the roller bearing devices 42 with their roller bearings 59 automatically if the friction torque exceeds a predefined threshold value. As described below the threshold value can be tuned by the design of the roller bearing devices 42.

Figure 6:
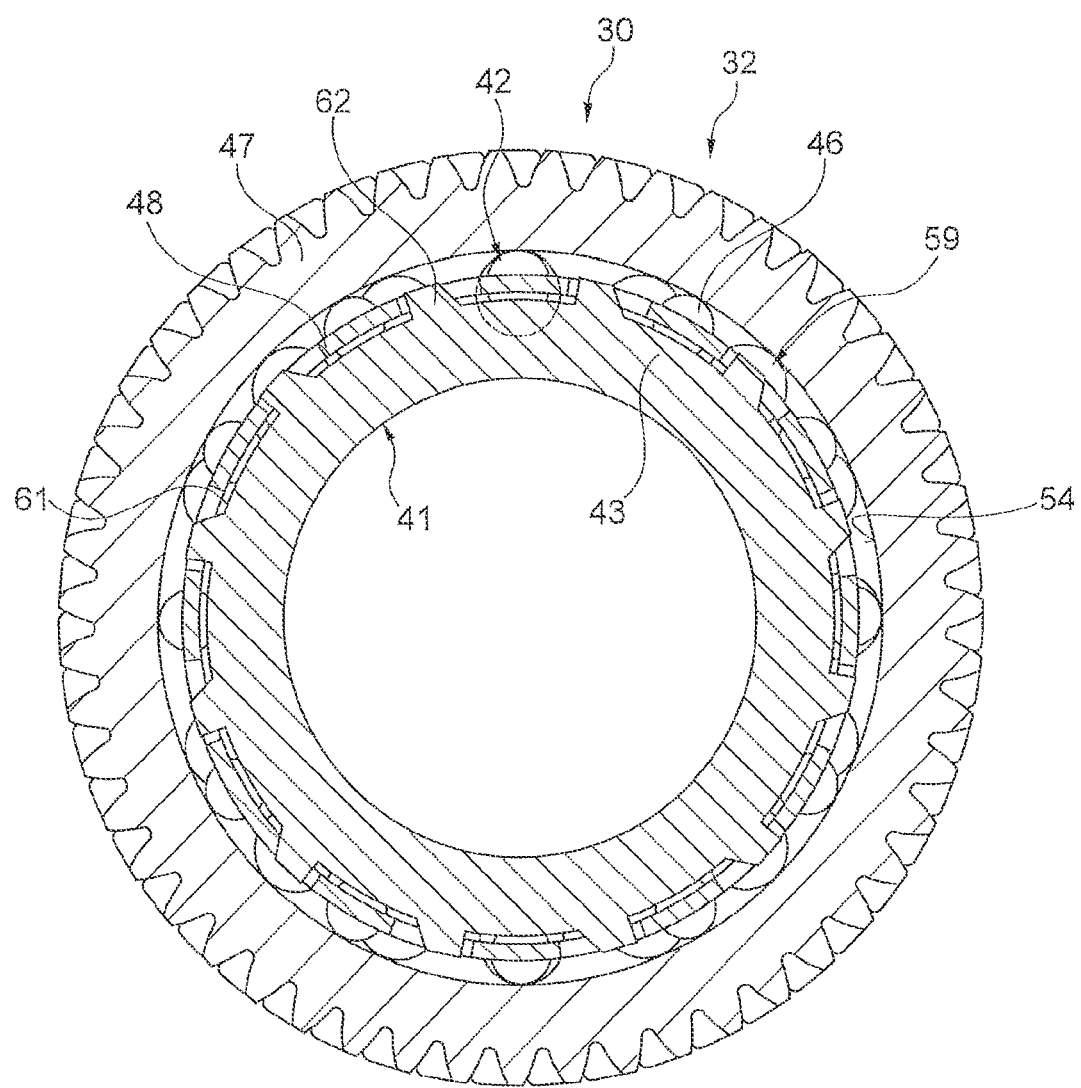
FIG. 6 is a cross-sectional view of the planet gear along a sectional plane VI shown in FIG. 4.
Figure 7:
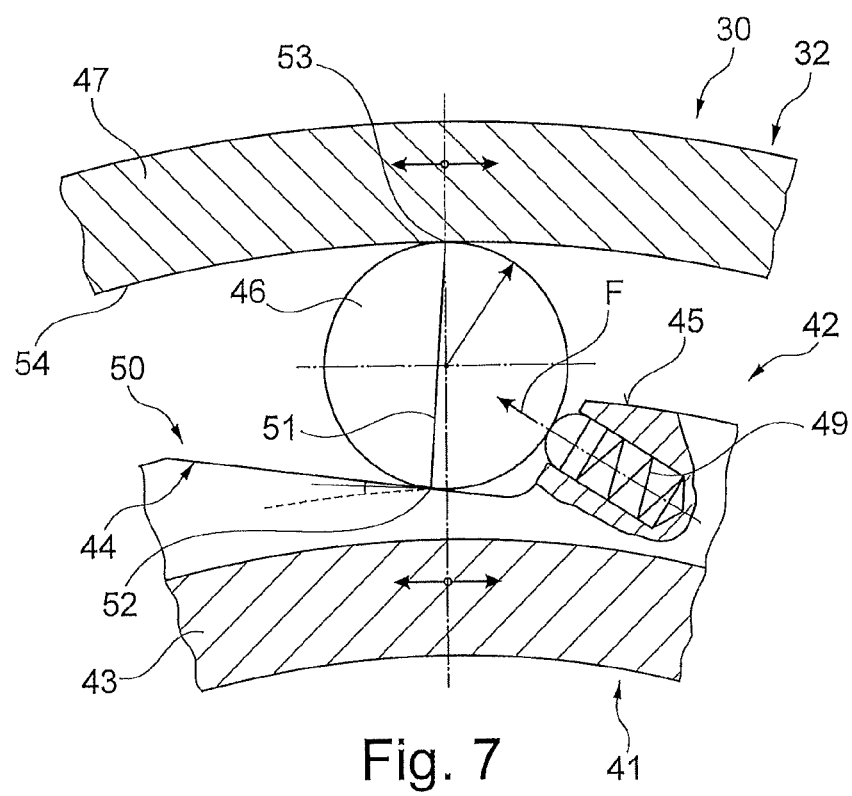
FIG. 7 is a partially cross-sectional view of the planet gear according to FIG. 4 in a first operating state of the gearbox.
Figure 8:
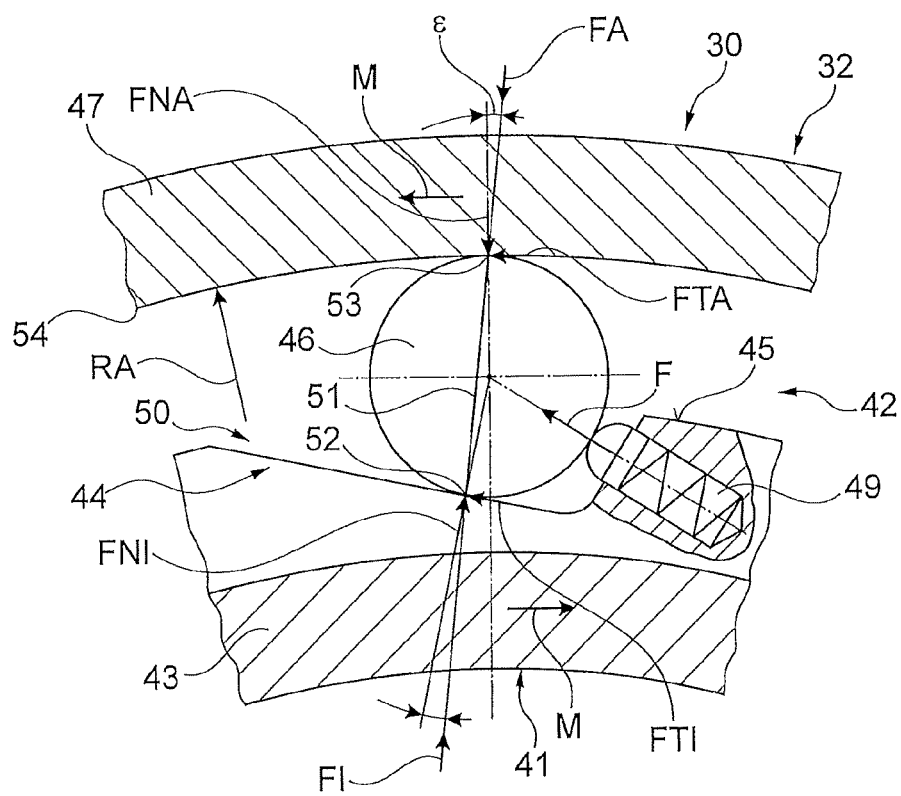
FIG. 8 is a partially cross-sectional view of the planet gear according to FIG. 4 in a second operating state of the gearbox.

With reference to FIG. 6, bearing cages 48 are shown whose movements are limited radially by a circular raceway 61 of the inner ring 43 and tangentially by springs 49 shown in FIG. 7 and FIG. 8. The springs 49 are arranged between parts of the cages 48 and castellations 62 of the inner ring 43 which are illustrated in FIG. 6. As shown simplified in FIG. 7 and FIG. 8, each roller element 46 of the freewheels 42A is forced in the direction of an area 50 of the respective roller ramp 44 by a spring force F of the springs 49, in which direction the roller elements 46 are blocking the relative movement between the radial inner rings 43 and the outer rings 47.

In the operating state shown in FIG. 7 the outer rings 47 can be turned freely clockwise (free-wheeling operation), if the radial inner rings 43 are at a standstill, are turned counter clockwise or are turned clockwise slower than the outer rings 47. The load is transferred from the inner ring 43 to the outer ring 47 via further roller elements 63 of the freewheels 42A which are arranged radially and rotatable between an outer raceway 64 of the inner ring 43 and an inner raceway 65 of the outer ring 47.

If the outer rings 47—e.g. with stationary radial inner rings 43—are turned in the opposite direction, the clamping of the roller elements 46 in the roller ramps 44 of the freewheels 42A becomes effective. The roller elements 46 clamp without slipping between the radial inner rings 43 and the outer rings 47. In this direction of rotation high torque can be transmitted.

The embodiment of the freewheel 42A illustrated in FIG. 7 and FIG. 8 also enables a freewheeling operation while the radial inner rings 43 are turned counter-clockwise and a driving operation when turning clockwise.

On the line 51 of influence which links the points 52, 53 of contact of the roller elements 46 to the roller ramps 44 and the roller elements 46 to the outer tracks 54 of the outer rings 47, in driving operation the clamping generates forces FI and FA. Because of the equilibrium of forces, these are equal. The forces FI and FA can be divided into normal forces FNI and FNA as well as into the circumferential forces FTI and FTA. The line 51 of influence forms against the force FNI or FNA a clamping angle $\varepsilon$. To achieve self-locking, the tangent of the clamping angle $\varepsilon$ must be less than the friction value $\mu$. E.g. for the contact point 53 of the roller 46 to the outer track 54 this means:

$$\tan \varepsilon = FTA/FNA \geq \mu$$

Because of the relationship:

$$M = z \cdot RA \cdot FTA = z \cdot RA \cdot FNA \cdot \tan \varepsilon$$

With:
z: number of roller elements 46
RA: radius of the outer track 54

The normal forces FNI and FNA as well as the clamping angle $\varepsilon$ adapt automatically to the acting torque M.

According to the above mentioned explanation the threshold value may be adaptable by modifying the spring force F of the spring 49 and/or by modifying the value of the tangent of the clamping angle $\varepsilon$ of the roller ramp 44.

Figure 9:
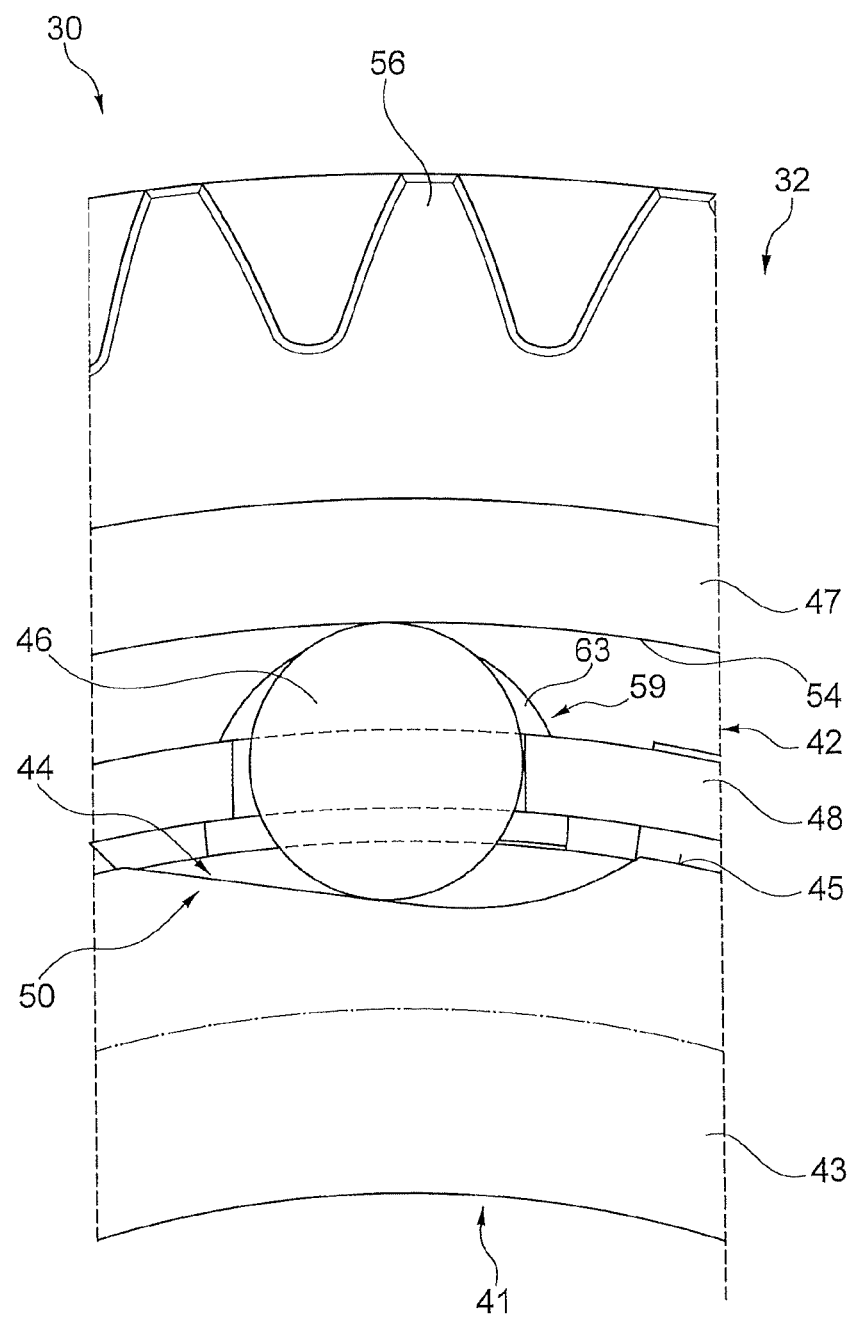
FIG. 9 is a partially cross-sectional view of the part of the planet gear according to FIG. 4, which is in contact with a ring gear in a further operating state of the gearbox.
Figure 10:
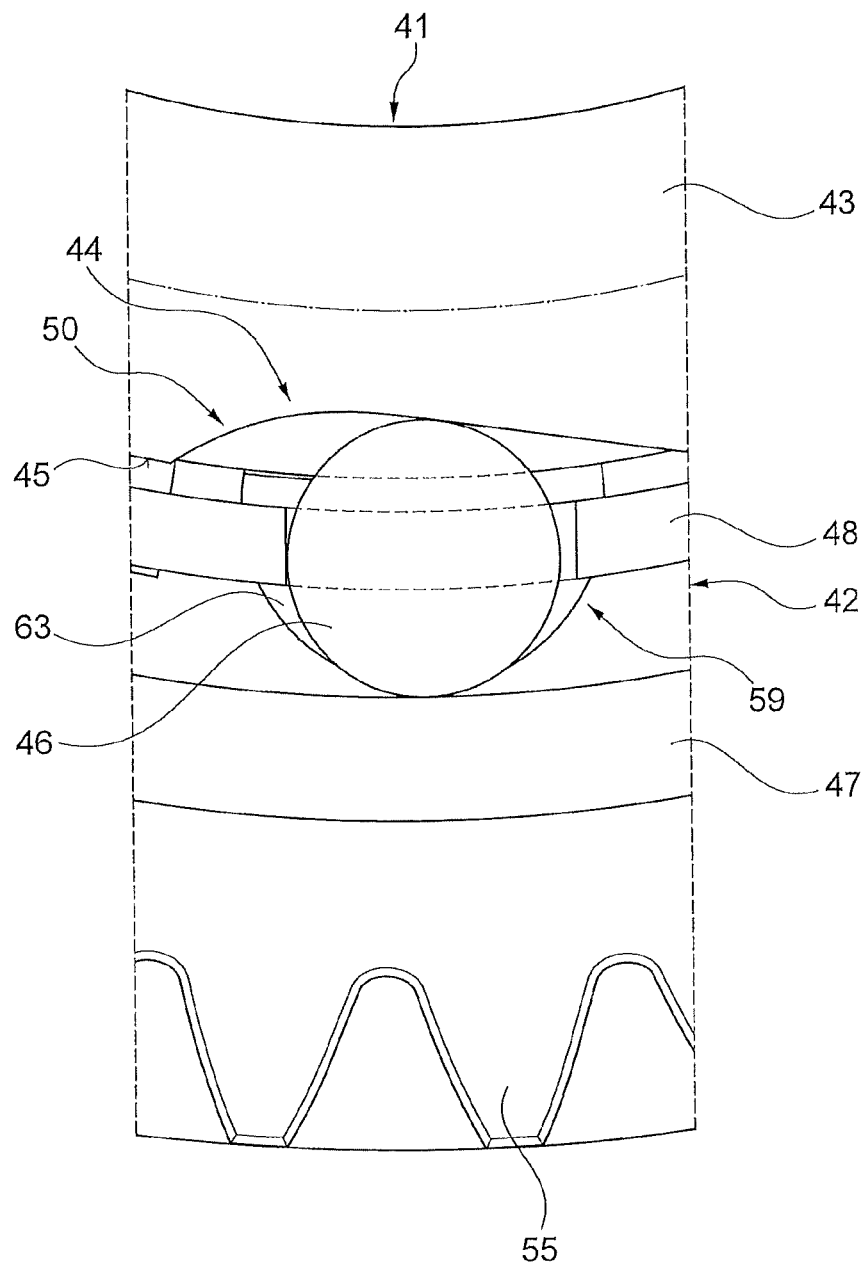
FIG. 10 is a partially cross-sectional view of the part of the planet gear according to FIG. 4, which is in contact with a sun gear in the further operating state of the gearbox.

With reference to FIG. 5, the outer ring 47 rotates clockwise with respect to pin 29 and the freewheels 42A are locked when the friction torque is lower than the predefined treshold value. In the last mentioned operational state of the freewheels 42A all the roller elements 46 are pressed against the outer rings 47 and the radial inner rings 43, which both spin at the same rotating speed. This operational state of the freewheels 42A is shown in FIG. 9 and FIG. 10. A part of the planet gear 32, which comprises the teeth 56, can be seen in FIG. 9, whereas FIG. 10 shows a different part of the planet gear 32 including the teeth 55.

The low torque load paths go through the roller elements 46, which also carry the rotating force vector of the centrifugal force and an additional force originated by the planet carrier 34 torque coming from the pin 29. The last-mentioned torque acts radially on the planet gear 32 and rotates with respect to it. Under this operational state, roller elements 63 of the roller bearings 59 are not in contact with the outer rings 47 and the radial inner rings 43, so they are not affected by the load during normal operative conditions.

If the friction torque exceeds the threshold value the roller elements 46 of the freewheels 42A run downwards over the roller ramps 44 and get out of contact with the outer rings 47 and with the radial inner rings 43. Hereafter the outer rings 47 are pushed outwards radially by the centrifugal force and tangentially with respect to the planet carrier reference system by the force generated by the gearbox torque until the roller elements 63 of the roller bearings 59 are in contact with the outer rings 47 and the radial inner rings 43. At that point, the load paths change, and the outer rings 47, which are then carried by the roller bearings 59 start spinning.

If the friction torque of the journal bearings 41 again falls below the threshold value, the relative movement between the outer rings 47 and the radial inner rings 43 will be blocked by the freewheels 42A, which will then be pushed by the revolving friction of the roller elements 46. At this operational state the journal bearings 41 will start to operate normally.

Figure 11:
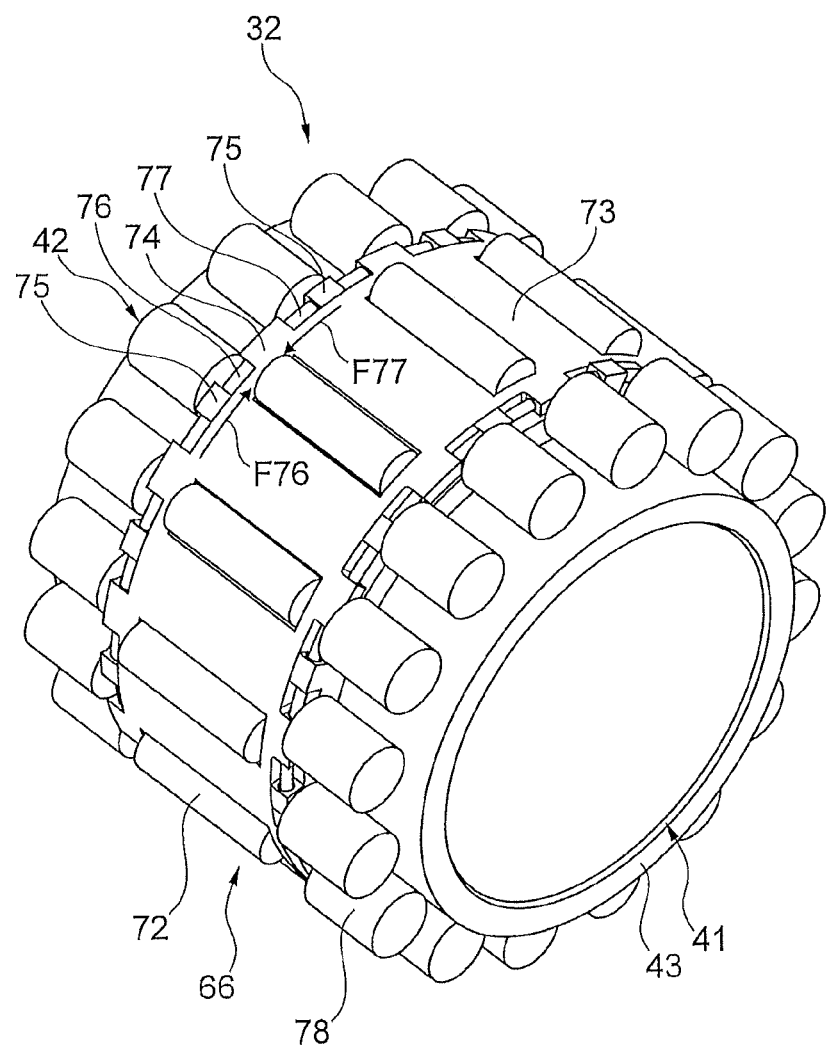
FIG. 11 is a three-dimensional view of a further embodiment of a planet gear of the gear box according to FIG. 3.
Figure 12:
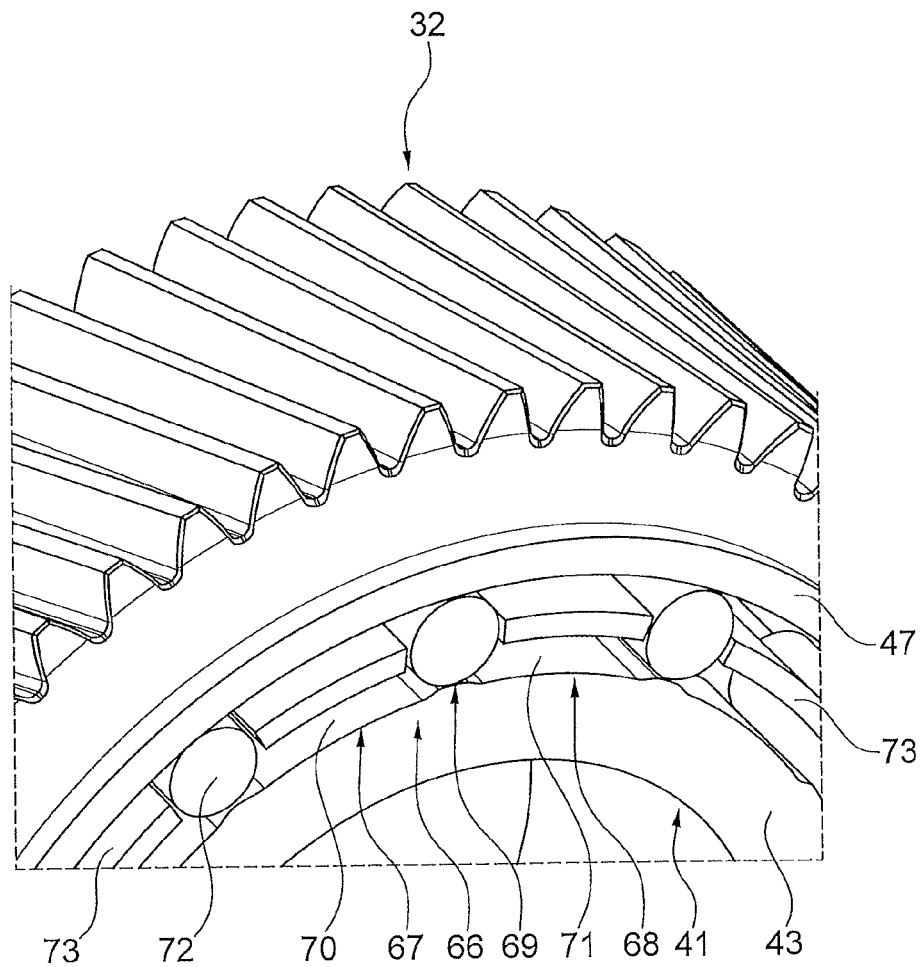
FIG. 12 is a three-dimensional partial section view of the planet gear according to FIG. 11.

FIG. 11 shows a further embodiment of the epicyclic gear system 30 in an illustration according to FIG. 4. Each of the roller bearing devices 42 of the epicyclic gear system 30 shown in FIG. 11 comprises a plurality of roller ramp units 66 which are arranged over the circumference of the inner ring 43. Furthermore, each of the roller ramp units 66 has two at least approximately mirror image-like arranged roller ramps 67, 68, and a plateau area 69 arranged there between which is shown in more detail in FIG. 12. The plateau area 69 extends radially further than surfaces 70, 71 of the two roller ramps 67, 68.

Moreover, each roller ramp unit 66 is cooperating with one roller element 72. The roller elements 72 are arranged radially between the inner ring 43 and the outer ring 47 and are also arranged in a bearing cage 73. The bearing cage 73 comprises castellations 74 which extend in axial direction of the planet gears 32. The inner ring 43 also provides castellations 75 which extend in radial direction of the planet gears 32. In circumferential direction of the inner ring 43 springs 76, 77 are arranged between the castellations 74 of the bearing cage 73 and the castellations 75 of the inner ring 43. The forces F76 and F77 of the springs 76, 77 are directed opposite to each other, so that the springs 76, 77 are arranging the roller elements 72 in the plateau areas 69 of the roller ramp units 66, if the friction force of the bearing 41 is smaller than or equal to the threshold value.

Figure 13:
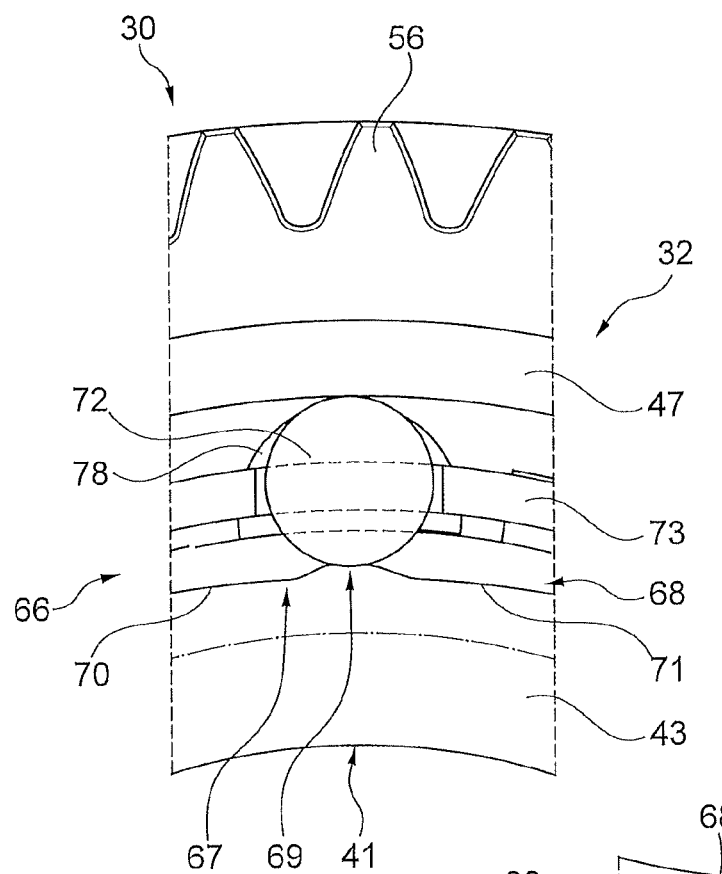
FIG. 13 is a partially cross-sectional view of a part of the planet gear according to FIG. 11 in a first further operating state of the gearbox.
Figure 14:
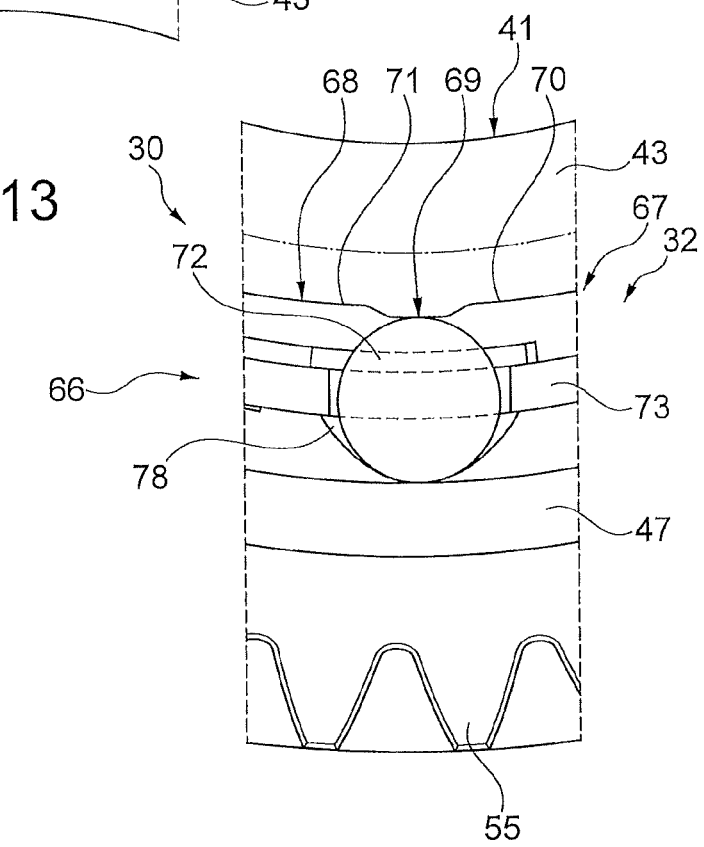
FIG. 14 is a partially cross-sectional view of a part of the planet gear according to FIG. 11 in the first further operating state of the gearbox.
Figure 15:
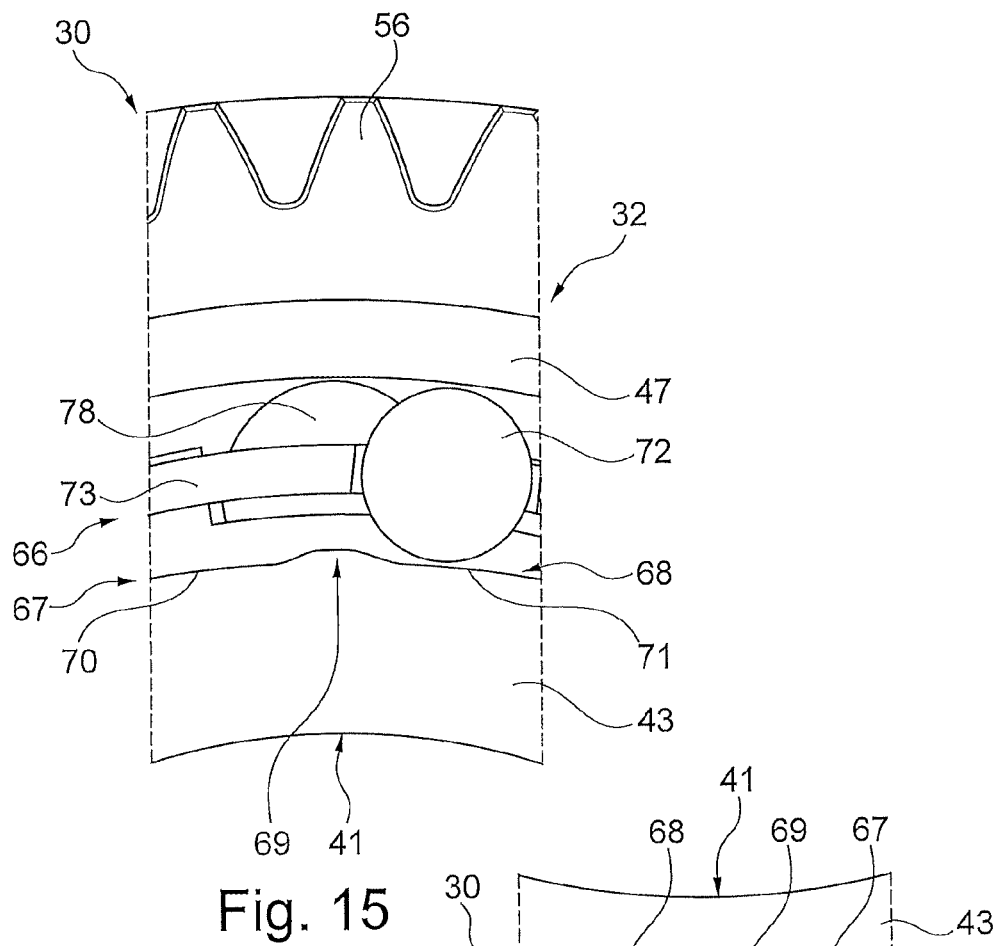
FIG. 15 is a partially cross-sectional view of a part of the planet gear according to FIG. 11 in a second further operating state of the gearbox.
Figure 16:
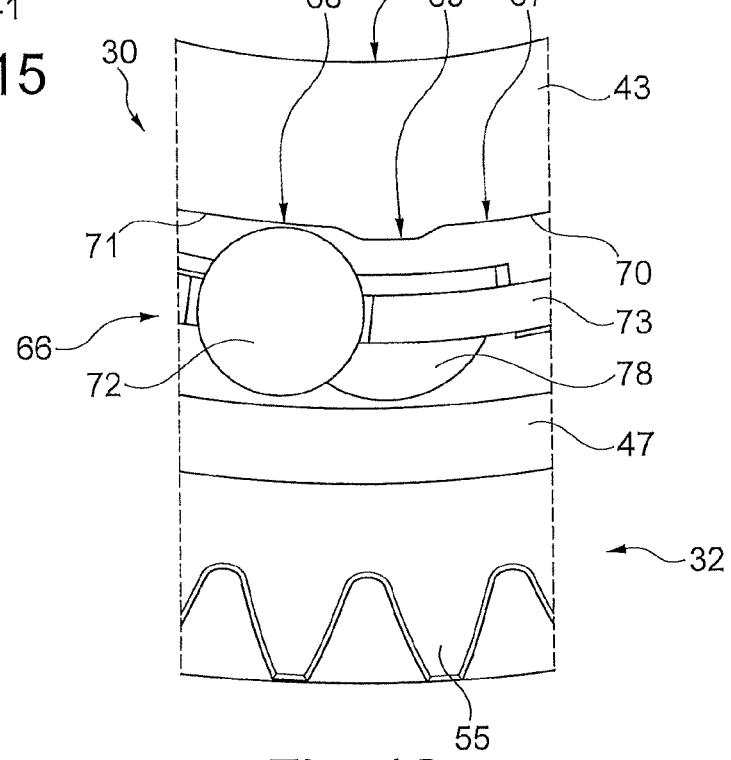
FIG. 16 is a partially cross-sectional view of a part of the planet gear according to FIG. 11 in the second further operating state of the gearbox.
Figure 17:
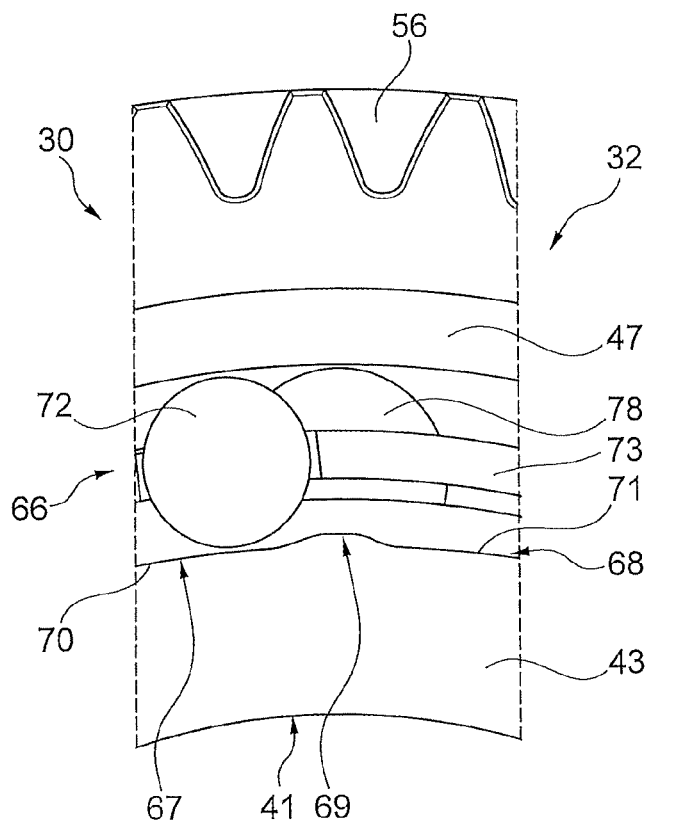
FIG. 17 is a partially cross-sectional view of a part of the planet gear according to FIG. 11 in a third further operating state of the gearbox.
Figure 18:
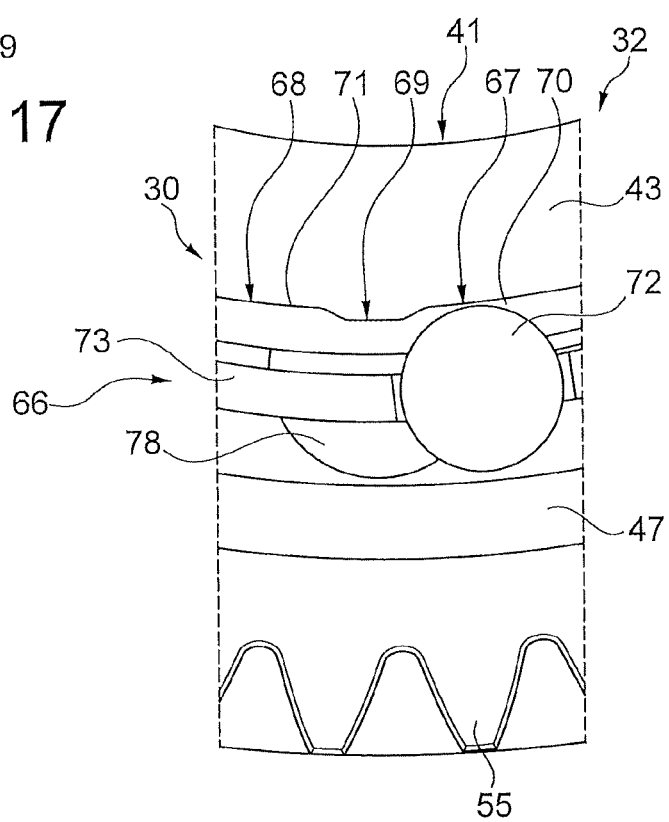
FIG. 18 is a partially cross-sectional view of a part of the planet gear according to FIG. 11 in the third further operating state of the gearbox.

In this so-called normal condition of the epicyclic gear system 30 only a small torque is applied to the roller bearing devices 42. The roller elements 72 are moving in this operational state in circumferential direction of the inner ring 43 slightly left or right. With force equilibrium of the springs 76, 77 the roller elements 72 are remaining as shown in FIG. 13 and FIG. 14 between the inner ring 43 and the outer ring 47 on the radially higher surface areas of the plateau areas 69 and close the load path between the inner ring 43 and the outer ring 47. In this condition no relative movements happen in circumferential direction of the rings 43 and 47 between the inner ring 43 and the outer ring 47.

If the friction force of the bearing 41 exceeds the threshold value, the torque applied to the roller bearing devices affects movement of the roller elements 72 and the bearing cage 73 as shown in FIG. 15 to FIG. 18 in circumferential direction of the rings 43 and 47 from the plateau areas 69 to the lower surface areas of the roller ramps 67 or 68. In this so-called failure condition, the load path is closed by further roller elements 78, and a relative movement in circumferential direction of the rings 43 and 47 between the rings 43 and 48 is released.

In the embodiment shown in FIG. 11 to FIG. 18, the contact between the planet gear 32 and the ring gear 38 or sun gear 28 respectively depends on the operating condition of the gear box 30. The gearbox 30 maybe subject to only torque, to only rotational speed or to torque and rotational speed.

If the gearbox 30 is subject to only torque, the direction of the axis passing through the gap closure and the maximum clearance is oriented tangentially with respect to the reference system centered with the main axis of the carrier 34.

If the gearbox 30 is subject to only rotational speed, the above mentioned axis is oriented radially with respect to the carrier reference system. Hence in this case, tooth 56 is the tooth toward the ring gear 38 and tooth 55 is the one toward the sun gear 28. The orientation of the axis will be determined by the prevailing of the centrifugal vs. the tangential forces and it will be angularly in the range comprised by the extreme conditions with only torque or only rotational speed.

The positive effect of the described solutions is that the centrifugal force and the force generated by the gearbox torque are not acting anymore on the journal bearings 41 if the friction in the area of the journal bearing exceeds a threshold value. This configuration of the epicyclic gear system offers the possibility of not causing a further increase of friction torque that would probably lead to an entire system failure. The journal bearings are now supported by the roller bearings at the sides of the roller bearing devices. The revolving friction in the area of the roller bearing devices is higher than the friction force which arises in the area of a journal bearing under normal conditions. On the other hand is the revolving friction lower than the friction which is generated by a journal bearing with a malfunction. This leads to a very robust system. The sliding contacts during the rotation of the roller ramp devices, e.g. between the springs, the roller ramps and the roller elements develop a dynamic friction where the abovementioned centrifugal force and gearbox torque generated force have only negligible influence.

PARTS LIST 9 principal rotational axis
10 engine
11 core
12 air intake
14 low-pressure compressor
15 high-pressure compressor
16 combustion equipment
17 high-pressure turbine
18 bypass exhaust nozzle
19 low-pressure turbine
20 core exhaust nozzle
21 nacelle
22 bypass duct
23 propulsive fan
24 stationary supporting structure
26 shaft
27 interconnecting shaft
28 sun gear
29 structural member
30 epicyclic gear system
32 planet gears
34 planet carrier
36 linkage
38 ring gear
40 linkage
41 journal bearing
42 roller bearing device
42A freewheel
43 radial inner ring
44 roller ramp
45 outer surface of the radial inner ring
46 roller element
47 outer ring
48 bearing cage
49 spring
50 area of the roller ramp
51 line of influence
52, 53 point
54 outer track
55, 56 teeth of the planet gear
57 teeth of the sun gear
58 teeth of the ring gear
59 roller bearing of the freewheel
61 circular raceway
62 castellations
63 further roller elements
64 outer raceway
65 inner raceway
66 roller ramp unit
67, 68 roller ramp
69 plateau area
70, 71 surfaces of the roller ramps
72 roller element
73 bearing cage 74 castellations
75 castellations
76, 77 spring
78 further roller elements
A core airflow
B bypass airflow
F spring force
FA, FI force
NA, FNI normal forces
FTA, FTI circumferential forces
F76, F77 spring force
M acting torque
RA inner radius of the outer ring
z number of roller elements of the freewheel
ε clamping angle
μ friction value

The invention claimed is:

1. An epicyclic gear system comprising:
a planet carrier including a structural member;
a planet gear;
a bearing arranged radially between the planet gear and the structural member to pivotally mount the planet gear on the structural member; and
a roller bearing device arranged radially between the planet gear and the bearing, the roller bearing device configured to prevent a relative movement between the planet gear and the bearing if a friction torque in a region of the bearing is less than or equal to a threshold value.

2. The epicyclic gear system according to claim 1, wherein the bearing is a journal bearing.

3. The epicyclic gear system according to claim 1, wherein the bearing is a roller bearing.

4. The epicyclic gear system according to claim 1, wherein the roller bearing device comprises a radially inner ring which is part of the bearing, and further comprises a plurality of roller ramps on a radially outer surface of the radially inner ring with a plurality of roller elements arranged radially between the radially inner ring and a radially outer ring, which is part of the planet gear.

5. The epicyclic gear system according to claim 4, wherein the roller ramps are configured to release the relative movement between the radially inner ring and the radially outer ring if the friction torque in the region of the bearing is greater than the threshold value.

6. The epicyclic gear system according to claim 4, wherein the roller bearing device comprises further roller elements, which are arranged radially between the radially inner ring and the radially outer ring, and over the further roller elements, a load is transmitted between the radially outer ring and the radially inner ring, wherein the load is effective during the relative movement between the radially inner ring and the radially outer ring.

7. The epicyclic gear system according to claim 6, wherein each of the roller elements of the roller bearing devices is forced by a spring force of at least one spring in a direction of an area of a respective one of the roller ramps, in which the roller elements lock the relative movement between the radially inner ring and the radially outer ring.

8. The epicyclic gear system according to claim 7, wherein the threshold value is adaptable by modifying the spring force of the at least one spring.

9. The epicyclic gear system according to claim 7, wherein the threshold value is adaptable by modifying a value of a tangent of a clamping angle of the respective one of the roller ramps.

10. The epicyclic gear system according to claim 1, wherein the roller bearing device comprises a plurality of roller ramp units, which are arranged over a circumference of the radially inner ring, with each of the roller ramp units including two symmetrically arranged ones of the roller ramps and a plateau area arranged therebetween, the plateau area extending radially outward further than the two symmetrically arranged ones of roller ramps.

11. The epicyclic gear system according to claim 10, wherein each of the roller ramp units cooperates with at least one roller element which is arranged between two springs, wherein the two springs position the at least one roller element in the plateau area if the friction torque is less than or equal to the threshold value.

12. The epicyclic gear system according to claim 1, wherein the roller bearing device comprises a freewheel.

13. The epicyclic system according to claim 12, wherein the freewheel is a roller freewheel.

14. A gas turbine engine for an aircraft comprising:
an engine core comprising a turbine, a compressor, and a shaft connecting the turbine to the compressor;
a fan located upstream of the engine core, the fan comprising a plurality of fan blades;
a gearbox that receives an input from the shaft, and outputs drive to the fan to drive the fan at a lower rotational speed than the shaft, wherein:
the gearbox is configured as the epicyclic gear system according to claim 1.

15. The gas turbine engine according to claim 14, wherein:
the turbine is a first turbine, the compressor is a first compressor, and the shaft is a first core shaft;
the engine core further comprises a second turbine, a second compressor, and a second shaft connecting the second turbine to the second compressor; and
the second turbine, the second compressor, and the second shaft are arranged to rotate at a higher rotational speed than the first shaft.

* * * * *